(No Model.)
R. M. HUNTER.
MIXING MACHINE.
No. 370,335. Patented Sept. 20, 1887.
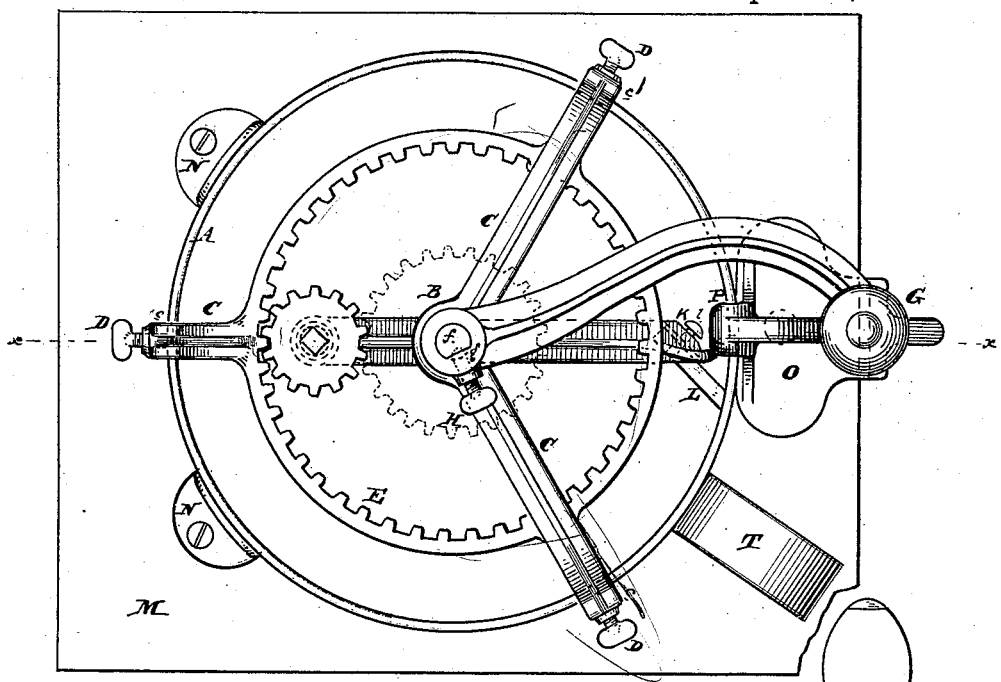
FIG. 1
FIG. 3
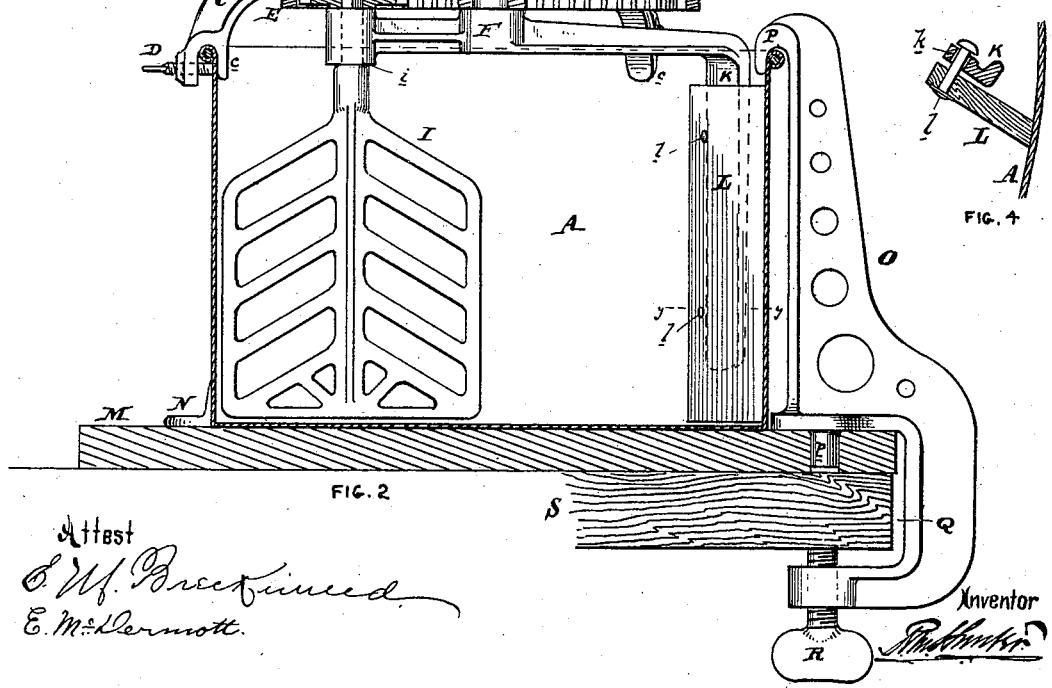
FIG. 2
FIG. 4
Attest
E. W. Breckinridge
E. McDermott.
Inventor
R. M. Hunter

UNITED STATES PATENT OFFICE.

RUDOLPH M. HUNTER, OF PHILADELPHIA, PENNSYLVANIA.

MIXING-MACHINE.

SPECIFICATION forming part of Letters Patent No. 370,335, dated September 20, 1887.

Application filed April 14, 1887. Serial No. 234,739. (No model.)

*To all whom it may concern:*

Be it known that I, RUDOLPH M. HUNTER, of the city and county of Philadelphia and State of Pennsylvania, have invented an Improvement in Mixing-Machines, of which the following is a specification.

My invention has reference to mixing-machines; and it consists in certain improvements, all of which are fully set forth in the following specification, and shown in the accompanying drawings, which form a part thereof.

The object of my invention is to construct a mixer which shall be especially adapted to household purposes for mixing cake-batters, beating eggs, &c., and which shall also be capable of mixing chemicals, and in fact any material which is in a finely-divided condition, either in the wet or dry state.

In carrying out my invention I provide a vessel of suitable material, preferably cylindrical, and to which the mixer proper is secured. The mixer proper consists of the frame-work supporting a large gear, which remains stationary, and to this frame-work is journaled a cranked arm provided with a handle, and to this arm is journaled the beater, which is provided on its upper end with a pinion adapted to mesh with the stationary gear. This cranked arm may also carry a suitable scraper adapted to scrape the sides of the vessel and throw the material toward the center and in the path of the beater. The above construction of mixer may be suitably clamped to a board, which in turn may be adjustably secured to the table upon which it rests. The essential feature of this mixer lies in the fact that the material to be treated is held stationary while the beater revolves upon its own axis and at the same time travels about a fixed point, and from which it will be seen that there is no possibility of churning up the material, and causing it to revolve with the beater without being mixed, as is so common in many machines now upon the market.

In the drawings, Figure 1 is a plan view of my improved mixer. Fig. 2 is a sectional elevation of same on line $x\,x$. Fig. 3 is a perspective view of one of the mixer-vessel supports, and Fig. 4 is a cross-section of the scraper and part of the vessel on line $y\,y$.

A is the vessel, which may be of any suitable shape or form and of any desired material. As shown, it is supposed to be made of tin and cylindrical in shape.

B is a central bearing, from which extends the arms C, terminating in suitable jaws, $c$, which rest over the upper edge of the vessel A, and is clamped thereto by thumb-screws D. Secured to these arms C is the stationary gear E.

F is the cranked arm, having the journal $f$ extending through the bearing B, and secured at its upper end to the handle G by means of a thumb-screw, H, and the upper end of the journal $f$ is made with a flattened part, $g$, which fits into a corresponding part in the handle to prevent slipping.

Journaled at $i$ to the arm F is the beater I, which may be made of any suitable shape, that shown being preferred. In practice this beater is made of malleable iron tinned. Secured to this beater at its upper end above the bearing $i$ is a pinion, J, which meshes with the stationary gear E. By turning the handle G the beater will be carried around the journal $f$, and at the same time it will be caused to revolve upon its own axis, thoroughly mixing every portion of the batter or material to be treated, and as the number of teeth in the pinion is not a multiple of those in the stationary gear E the beater will constantly shift its angle at every revolution—that is to say, that while it is in a radial line, as shown in the drawings, if we give one revolution to the handle G the next time the beater reaches the position shown it will not be in a radial line, but will change this angle, and so on more and more with each revolution of handle G.

The arm F may be extended, as at K, and to which may be secured a suitable scraper to scrape the walls of the vessel. In the construction shown the scraper L is made of wood, and is secured loosely to the extension K by a rivet, $l$, which passes through a large hole, $k$, in the extension K. By this means the batter or material to be treated presses upon the wood and keeps it running against the surface of the vessel with a slight pressure, and any irregularity in the walls of the vessel is compensated for by the free play in the scraper. By varying the diameters of the gear E and pinion J the number of revolutions imparted to the beater with one revolution of the handle may be varied; and, while an internal gear, E, is shown, it is evident that it is not absolutely necessary, as an external gear might be used, though not desirable. One of the arms C, between the bearing B and gear E, is shown as cut away to allow a more open space for the insertion of the materials to be treated; but such arm might be made continuous, if desired, as indicated in dotted lines, Fig. 2.

The mixer-vessel rests upon a board, M, and is centered by the guides or supports N, which are secured to said board and prevented from shifting by small teeth n, which extend down into the wood, and the vessel is clamped to the board and simultaneous therewith to the table S by means of a clamp, O. This clamp rests upon the board M and has its top hooked, as at P, to catch over the top of the vessel, and its lower part made with a jaw, Q, to extend over the edge of the board M and table, and is provided with a clamping-screw, R. To prevent any possibility of the clamp shifting, the under part of this clamp within the jaw is provided with an extending pin or lug, p, which projects into or through a suitable hole in the board M.

The vessel A is provided with a handle, T, which may be grasped while operating the handle G, whereby the operator may steady herself and at the same time exert greater power, and when the vessel is removed from the clamp the handle provides a ready means of conveying it.

The mixer-frame, with the beater, may be entirely removed from the vessel by simply unloosening the thumb-screws D.

It is evident that, in place of operating the machine by hand, any suitable well-known power mechanism might be made to revolve the cranked arm F.

I do not limit myself to the minor details of construction, as they may be provided in various ways without in the least departing from the spirit of my invention.

Having now described my invention, what I claim as new, and desire to secure by Letters Patent, is—

1. In a mixer, the combination of the stationary frame having a central bearing and fixed gear, a cranked arm journaled in said central bearing, a beater journaled in said cranked arm, and a pinion secured to the beater and meshing with the fixed gear, whereby the beater revolves upon its own axis and at the same time travels about a fixed point.

2. In a mixer, the combination of the frame having a central bearing and fixed gear and suitable clamps, a cranked arm journaled in said central bearing, a beater journaled in said cranked arm, an operating-handle, and a pinion secured to the beater and meshing with the fixed gear, whereby the beater revolves upon its own axis and at the same time travels about a fixed point.

3. In a mixer, the combination of the frame having a central bearing and fixed gear, a cranked arm journaled in said central bearing, a beater journaled in said cranked arm, a pinion secured to the beater and meshing with the fixed gear, whereby the beater revolves upon its own axis and at the same time travels about a fixed point, and a scraper carried by the cranked arm.

4. In a mixer, the combination of a vessel, the frame having a central bearing and fixed gear and supported by said vessel, a cranked arm journaled in said central bearing, a beater journaled in said cranked arm, and a pinion secured to the beater and meshing with the fixed gear, whereby the beater revolves upon its own axis and at the same time travels about a fixed point.

5. In a mixer, the combination of a vessel, the frame having a central bearing and fixed gear supported by said vessel, a cranked arm journaled in said central bearing, a beater journaled in said cranked arm, and a pinion secured to the beater and meshing with the fixed gear, whereby the beater revolves upon its own axis and at the same time travels about a fixed point, and a scraper carried by the cranked arm.

6. The combination of a circular vessel, a frame detachable therefrom but supported thereby and having a central bearing and concentric gear, a cranked arm journaled therein, a beater having a width equal to one-half the diameter of the vessel and journaled in said cranked arm, and a pinion on said beater and meshing with the gear.

7. The combination of a circular vessel, a frame detachable therefrom but supported thereby and having a central bearing and concentric gear, a cranked arm journaled therein, a beater having a width equal to one-half the diameter of the vessel and journaled in said cranked arm, a pinion on said beater and meshing with the gear, a scraper-arm secured to the cranked arm, and a loose scraper hinged to the scraper-arm and adapted to sweep the side of the vessel.

8. In a mixer, the combination of a stationary circular vessel to contain the material to be treated in a stationary mass, a revolving beater journaled out of the center of the vessel, and revolving bearing for said beater arranged to move about a fixed point, whereby the beater revolves upon its own axis and also about a fixed point.

9. In a mixer, the combination of the frame having a central bearing and fixed gear, a cranked arm journaled in said central bearing, a beater journaled in said cranked arm, a pinion secured to the beater and meshing with the fixed gear, whereby the beater revolves upon its own axis and at the same time travels about a fixed point, the number of teeth in the pinion not being a multiple of those of the fixed gear.

10. The combination of vessel A, frame C, having gear E and bearing B, crank-arm F, handle G secured thereto, beater I, made of open-work, having a pinion, J, meshing with gear F, and scraper L, of wood, carried by the arm F by pins or rivets $l$, substantially as and for the purpose specified.

11. The combination of the base-board M, having guides for the mixer-vessel, a mixer having a vessel adapted to rest upon said board and against said guides, a clamp, O, having its upper part hooked, as at P, to catch over the top of the vessel, and its lower part provided with a clamp.

12. The combination of the base-board M, having guides for the mixer-vessel, a mixer having a vessel adapted to rest upon said board and against said guides, a clamp, O, having its upper part hooked, as at P, to catch over the top of the vessel, and its lower part provided with a stud, $p$, entering the base-board, and a clamp to clamp the board and mixer to a table.

In testimony of which invention I hereunto set my hand.

RUDOLPH M. HUNTER.

Witnesses:
BUTLER KENNER HARDING,
E. M. BRECKINREED.